United States Patent [19]
Carpenter

[11] Patent Number: 5,217,093
[45] Date of Patent: Jun. 8, 1993

[54] DISC BRAKES

[75] Inventor: Nigel J. Carpenter, Gwent, Wales

[73] Assignee: Lucas Industries public limited company, Solihull, England

[21] Appl. No.: 732,916

[22] Filed: Jul. 19, 1991

[30] Foreign Application Priority Data

Jul. 25, 1990 [GB] United Kingdom ............ 9016355

[51] Int. Cl.⁵ .................................. F16D 55/227
[52] U.S. Cl. .................... 188/73.45; 188/67; 188/83; 188/196 P; 188/71.8; 188/73.35; 188/73.44
[58] Field of Search ........... 188/73.35, 73.45, 73.44, 188/73.36, 196 P, 83, 78, 67, 71.8

[56] References Cited

U.S. PATENT DOCUMENTS

| | | | |
|---|---|---|---|
| 2,390,168 | 12/1945 | Piot | 188/67 |
| 2,644,549 | 7/1953 | Cagle | 188/196 P |
| 2,651,531 | 9/1953 | Smith | 188/67 X |
| 2,758,801 | 8/1956 | Bonanno | 188/78 X |
| 2,878,901 | 3/1959 | Runner | 188/67 X |
| 3,009,747 | 11/1961 | Pitzer | 188/83 X |
| 4,310,075 | 1/1982 | Johannesen et al. | 188/73.35 X |
| 4,418,798 | 12/1983 | Johannesen et al. | 188/73.35 X |
| 4,480,724 | 11/1984 | Hoffman, Jr. | 188/73.45 |
| 4,632,591 | 12/1986 | Fullenkamp . | |

FOREIGN PATENT DOCUMENTS

| | | | |
|---|---|---|---|
| 0076729 | 4/1983 | European Pat. Off. . | |
| 0080931 | 6/1983 | European Pat. Off. . | |
| 1799515 | 4/1959 | Fed. Rep. of Germany . | |
| 2414174 | 10/1975 | Fed. Rep. of Germany ... | 188/73.45 |
| 10837 | 2/1981 | Japan | 188/73.45 |
| 160431 | 12/1981 | Japan | 188/73.45 |
| 61340 | 4/1983 | Japan | 188/73.45 |
| 224530 | 9/1989 | Japan | 188/73.45 |
| 945948 | 1/1964 | United Kingdom | 188/71.8 |

*Primary Examiner*—George E. A. Halvosa
*Attorney, Agent, or Firm*—Oblon, Spivak, McClelland, Maier & Neustadt

[57] ABSTRACT

The present specification discloses a clamp member and a torque taking member with the clamp member being slidably mounted on the torque taking member by at least one sliding pin connection, whereby the clamp member can slide relative to the torque taking member to apply a friction pad to each side of a braking disc. The at least one pin connection comprises a pin which engages in a bore with a flexible sleeve located on the pin, the flexible sleeve engaging the wall of the bore. The pin has a two part construction with the flexible sleeve located between said parts, said parts being secured together so as to deform the flexible sleeve radially outwardly into engagement with the wall of the bore.

11 Claims, 4 Drawing Sheets

DISC BRAKES

The present invention relates to a disc brake.

In particular the present invention relates to a disc brake comprising a clamp member and a torque taking member, the torque taking member, in use, being fixedly mounted on a vehicle, with the clamp member being slidably mounted on the torque taking member. By activating a hydraulic actuator in the clamp member a friction pad is applied to one side of a braking disc, the clamp member sliding relative to the torque taking member to apply a further friction pad to the other side of the braking disc. In such a disc brake the sliding connection between the torque taking member and the clamp member may be provided by a pair of pins, the pins in one construction being secured to the torque taking member with the clamp member sliding on the pins, whilst the pins in another construction are secured to the clamp member and slidable in bores in the torque taking member. The pins are dimensioned to be a clearance fit in the bores in which they are axially slidable, to thus allow for manufacturing tolerances and to prevent the pins jamming in the bores under heavy braking when the torque taking member or the clamp member deflects. The clamp member is thus free to move relative to the torque taking member in both the axial and the radial sense. In the event of the braking disc running out of true either as a result of manufacturing tolerances or due to continual heating and cooling as a result of braking, the disc may contact the friction pads after brake release causing the clamp member to move back and forth. This creates undesirable noise as well as disc wear which further accentuates the problem. To overcome this problem it is known to provide rubber sleeves on the pins, the rubber sleeves contacting the walls of the bores in which the pins slidably engage, to provide some frictional contact between the clamp member and torque taking member to thus resist any oscillating motion and any resultant noise which may be produced by the deformed braking disc continually hitting a friction pad. The rubber sleeves also deform should the clamp member flex under heavy braking. However whilst this solution is known there are manufacturing problems in locating a pin in a bore with a rubber sleeve around the pin, the external diameter of the sleeve being larger than the diameter of the bore. Thus a compromise has had to be reached between the amount of frictional grip that can be achieved i.e. how much larger in diameter the sleeve can be as compared to the diameter of the bore, and the ease of insertion of the pin and sleeve into the bore during manufacture. Clearly more frictional grip than is feasible, is desirable.

The aim of the present invention is to provide a pin sliding disc brake wherein the pins have the desired amount of frictional grip with the bores in which they are slidably engaged, with it being easy to insert the pins into the bores during manufacture.

According to the present invention there is provided a disc brake comprising a clamp member and a torque taking member with the clamp member being slidably mounted on the torque taking member by means of at least one pin, whereby the clamp member can slide relative to the torque taking member to apply a friction pad to each side of a braking disc, the at least one pin engaging in a bore and having a two part construction with a flexible sleeve located between said parts, said parts being secured together so as to deform the flexible sleeve radially outwardly into engagement with the wall of the bore.

In one embodiment of the present invention wherein two pins are secured to the torque taking member and are slidably engaged in bores in the clamp member, each pin has a free end region comprised of a bolt which is screw threadedly engaged in an axially extending, complementarily threaded bore in a reduced diameter end section of the pin. A flexible and resiliet sleeve, e.g. a rubber sleeve, fits over the reduced diameter section of the pin and is held in position by the bolt, the bolt having a head which has a smooth cylindrical periphery of the same diameter as the remainder of the pin. A hexagonal recess for the insertion of a suitable tool is provided in the axial end face of the bolt head. The flexible rubber sleeve is longer than the axial extent of the reduced diameter section of the pin, the external diameter of the sleeve being the same as or just slightly larger or smaller than the diameter of the pin. Thus with the bolt loosely engaged in the complementarily threaded bore so that the flexible and resilient sleeve is not compressed axially, the pin can be easily inserted in one end of a bore in the clamp member. Access being possible from the other end of the bore, the tool can be engaged in the hexagonal recess and the bolt tightened. By tightening the bolt, the sleeve is axially confined to the axial extent of the reduced diameter section of the pin and is thus deformed radially outwardly into frictional engagement with the wall of the bore in the clamp member. By selecting the length of the sleeve and the length of the reduced diameter section of the pin, a desired frictional grip between the pin and bore wall can be simply achieved during assembly by merely tightening the bolt. The other end of the bore in the clamp member may then be plugged.

Various alternative constructions are possible. The flexible sleeve may merely take the form of a flexible ring with the reduced diameter section of the pin being suitably dimensioned. Further, part of the reduced diameter section of the pin may be provided on the shaft of the bolt. Also the sleeve may incorporate an inner support sleeve for reinforcement purposes, the inner support sleeve being shorter than the overall length of the flexible sleeve. A further possible modification is to the bolt head in the region which engages the sleeve. The bolt head may be chamfered or recessed to provide for a desired specific deformation of the sleeve.

In another embodiment of the present invention wherein the pins are secured to the clamp member and slidably engaged in bores in the torque taking member, each pin is constructed in the form of two like dimensioned cylindrical sleeves with a bolt passing through the sleeves and engaging in a complementarily threaded bore in the clamp member. Thus the sleeves are held in coaxial alignment, the pin sleeves having reduced diameter end sections at their interengaging ends. During assembly a flexible and resilient sleeve, e.g. a rubber sleeve, is located on the reduced diameter end sections of the pin sleeves and the pin is loosely bolted to the clamp member. As the flexible sleeve is of the same or like diameter as the pin, the pin can be easily inserted in a bore in the torque taking member, the bolt then being tightened. As the sum of the axial extents of the reduced diameter sections of the pin sleeves is less than the length of the flexible sleeve, the flexible sleeve deforms radially outwardly as the bolt is tightened to thus frictionally grip the wall of the bore. Again by selecting the length of the reduced diameter sections and the length of the flexible sleeve, the desired frictional grip can be obtained by merely tightening the bolt.

In an alternative construction a reduced diameter section may be provided on only one of the pin sleeves with the flexible sleeve being appropriately dimensioned. Further the shoulder of one or both pin sleeves between the reduced diameter section and the diameter of the remainder of the pin can be profiled to achieve a desired specific deformation of the sleeve. Also the flexible sleeve may take the form of a flexible ring.

The present invention will now be further described, by way of example, with reference to the accompanying drawings, in which.

Figure 1:
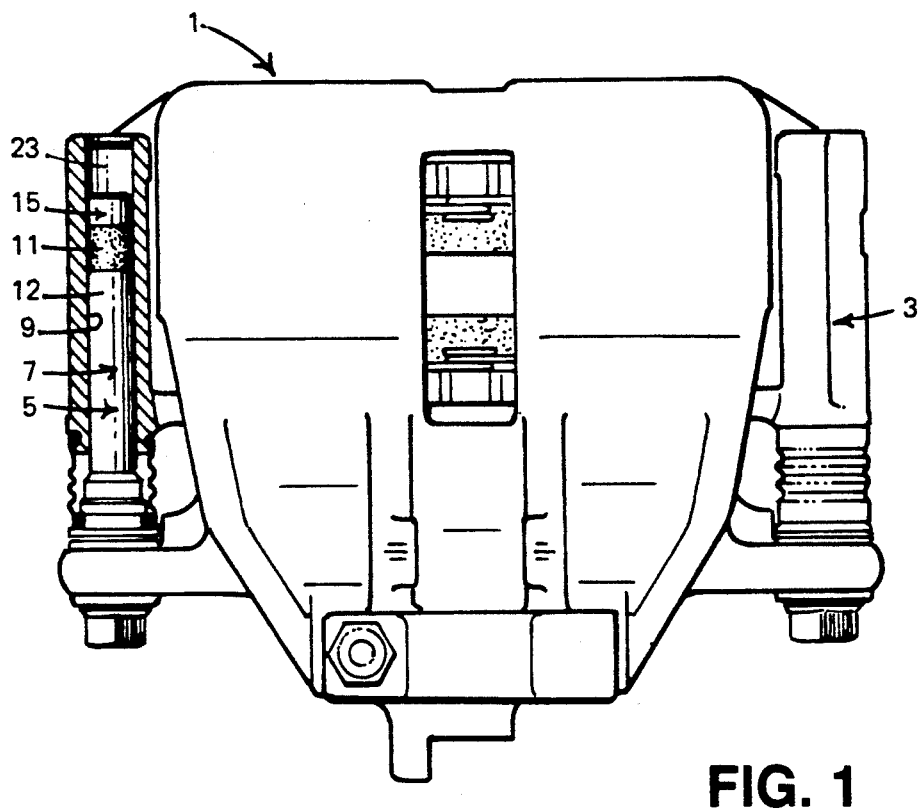
FIG. 1 is a plan view, partially cross sectioned, of one embodiment of the present invention.
Figure 2:
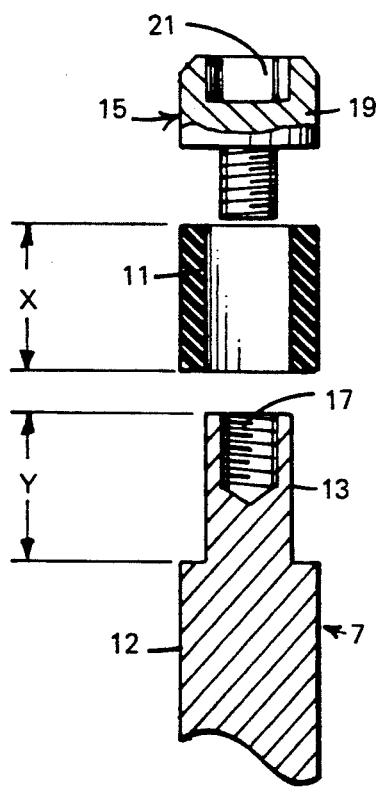
FIG. 2 is a cross-sectional exploded view of one end region of one of the pins used to support the clamp member in the embodiment of FIG. 1.
Figure 3:
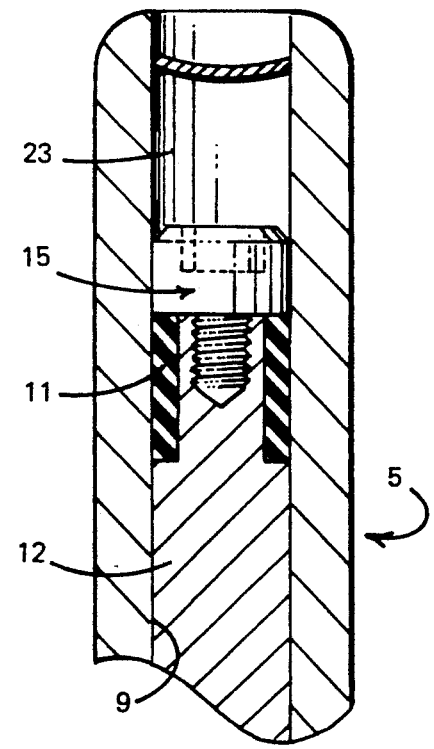
FIG. 3 is a cross-sectional assembled view of FIG. 2.

One embodiment of the present invention is illustrated in FIGS. 1 to 3 of the accompanying drawings. This embodiment comprises a clamp member 1 and a torque taking member 3, the clamp member 1 being slidably mounted on the torque taking member by a pair of sliding pin connections 5, so that the clamp member 1 can move relative to the torque taking member 3 on actuation of a hydraulic actuator in the clamp member 1 to apply friction pads (not shown) to opposite sides of a braking disc (not shown).

Each sliding pin connection 5 comprises an elongate pin 7, one end region of which is secured to the clamp member 1, the other free end region of the pin 7 slidably engaging in a bore 9 in the torque taking member 3. To resist spurious axial movement of the pin 7 in the bore 9 a flexible and resilient rubber sleeve 11 is provided on the said other free end region of the pin 7, the sleeve 11 engaging the wall of the bore 9 to produce the desired frictional grip. As best seen in FIGS. 2 and 3 each pin 7 comprises two parts, a bolt 15 and the remainder 12 of the pin 7. The said other free end region of each pin 7 comprises a reduced diameter section 13 of said remainder 12 of the pin 7, and said bolt 15, said bolt 15 being screwed into a complementarily threaded axially extending blind bore 17 provided in said reduced diameter section 13. The bolt 15 has a head 19 which has a cylindrical periphery with a diameter which is identical to the diameter of the major part of the pin 7. Also the bolt head 19 has a hexagonal recess 21 in its axial end face for the insertion of a suitable tool. During assembly of the brake the flexible sleeve 11 is located on the reduced diameter section 13 of the pin 7, the internal diameter of the sleeve 11 being complementary (apart from usual manufacturing tolerances) to the external diameter of the reduced diameter section 13, and the external diameter of the sleeve 11 being substantially equal to the external diameter of the major part of the pin 7. The bolt 19 is then engaged in the bore 17. The assembled pin 7 is then slid into one end of the bore 9 in the clamp member 1 and the said tool is engaged in the hexagonal recess 21 in the bolt 19 via the other end 23 of the bore 9. The bolt 19 is then tightened and as the axial extent 'X' of the sleeve 11 is greater than the axial extent 'Y' of the reduced diameter section 13, the sleeve 11 is deformed radially outwardly into contact with the wall of the bore 9. By selecting 'X' and 'Y' the desired expansion of the sleeve 11, and thus frictional grip between the pin 7 and the bore 9 can be achieved.

Figure 4:
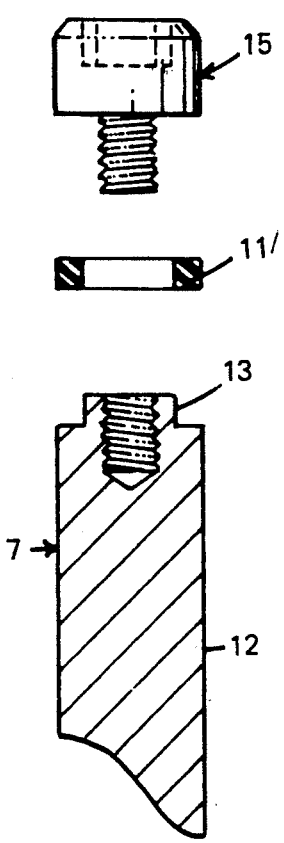
FIG. 4 is a cross-sectional exploded view of a modified end region of a pin suitable for use in the embodiment of FIG. 1.
Figure 5:
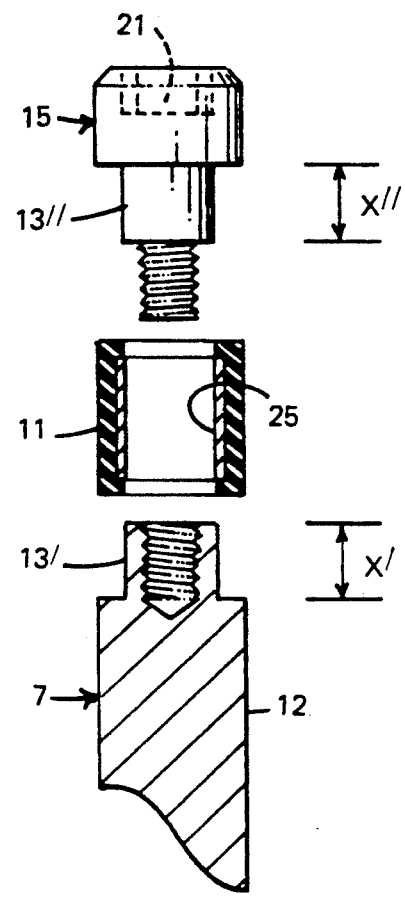
FIG. 5 is a cross-sectional exploded view of a further modified end region of a pin suitable for use in the embodiment of FIG. 1.

Two modified pin constructions suitable for use in the embodiment of FIGS. 1 to 3, are illustrated in FIGS. 4 and 5 of the accompanying drawings. same reference numerals as used in FIGS. 1 to 3, are used in FIGS. 4 and 5 to identify like parts. The modified construction of FIG. 5 differs from the construction shown in FIGS. 2 and 3 by virtue of the fact that part of the reduced diameter section 13 of the pin 7 is provided on the bolt 15. Thus the flexible sleeve 11 is carried on the reduced diameter section 13' of the major part of the pin 7 and on the reduced diameter portion 13" of the bolt 15. The axial extent 'X' of the reduced diameter section 13 is thus comprised of X' and X". Further reinforcement in the form of a reinforcing sleeve 25 is provided in the flexible sleeve 11, the sleeve 25 being shorter in length than the flexible sleeve 11.

Figure 6:
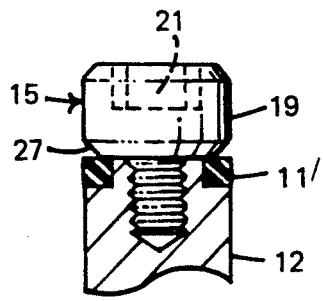
FIG. 6 is a cross-sectional view of a still further modified end region of a pin suitable for use in the embodiment of FIG. 1.
Figure 7:
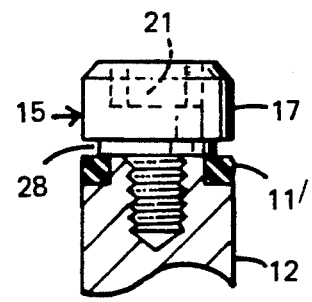
FIG. 7 is a cross-sectional view of a still further modified end region of a pin suitable for use in the embodiment of FIG. 1.
Figure 8:
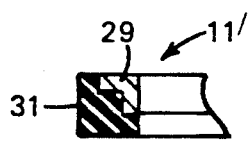
FIG. 8 is a cross-sectional view of part of a flexible sleeve suitable for use in FIG. 6 or FIG. 7.

The modified construction of FIG. 4 differs from the construction shown in FIGS. 2 and 3 by virtue of the fact that the flexible sleeve is in the form of an annular ring 11', with the reduced diameter section 13 of the pin 7 being appropriately dimensioned as regards length. The construction of FIG. 4 is further modified in FIGS. 6 and 7 wherein the bolt head 19 is profiled at 27 (annular chamfer) and 28 (annular cutaway) respectively. This enables the annular ring 11' to deflect in a controlled manner upon actuation of the brake, such deflection resulting in a restoring force being generated upon brake release, such that a degree of positive retraction of the clamp member is experienced. A particular construction of annular ring 11' suitable for use in the constructions of FIGS. 4, 6 and 7, is illustrated in cross section and in part in FIG. 8, the ring having reinforcement in the form of a stepped cross-section reinforcing ring 29 onto which a rubber section 31 is bonded. Again this produces a particular desired deformation of the rubber section 31 when the bolt 15 is tightened.

Figure 9:
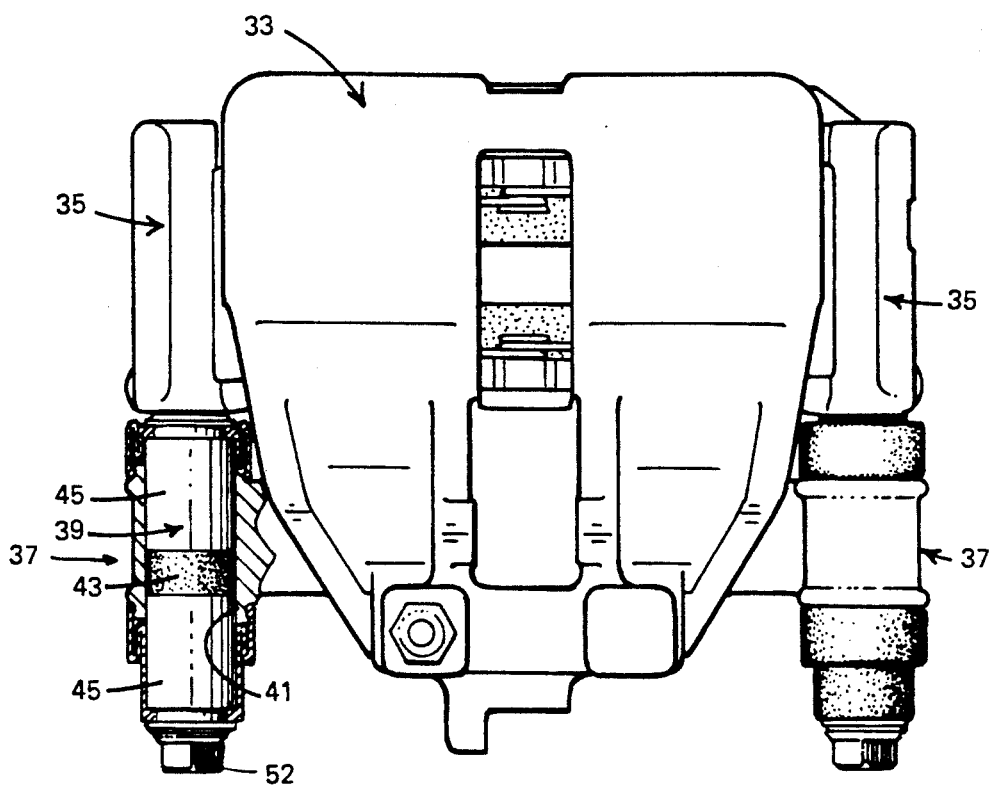
FIG. 9 is a plan view, partially cross-sectioned, of another embodiment of the present invention.
Figure 10:
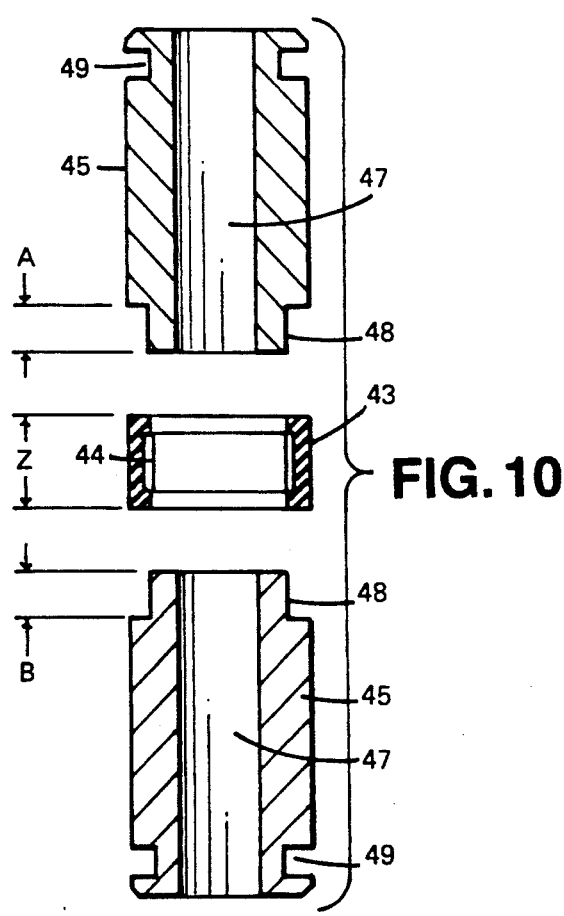
FIG. 10 is a cross-sectional exploded view of one end region of one of the pins used to support the clamp member on torque taking member in the embodiment of FIG. 9.
Figure 11:
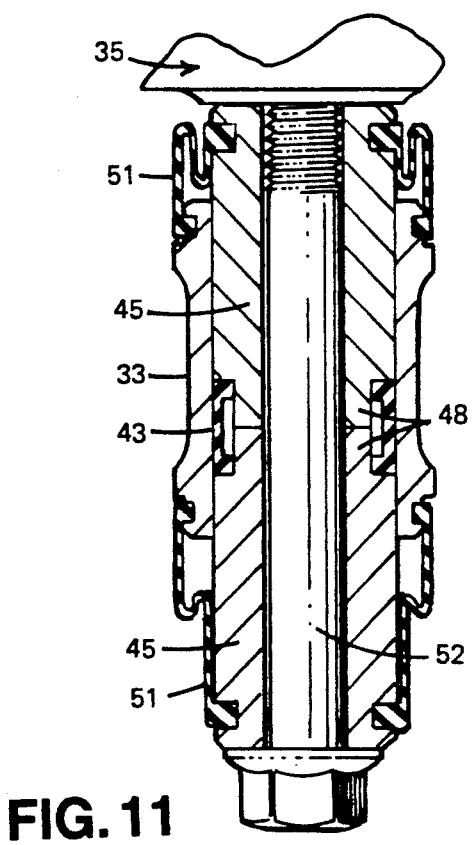
FIG. 11 is a cross-sectional assembled view of FIG. 9.

Another embodiment of the present invention is illustrated in FIGS. 9, 10 and 11 of the accompanying drawings. This embodiment comprises a clamp member 33 and a torque taking member 35, the clamp member 33 being slidably mounted on the torque taking member by a pair of sliding pin connections 37, so that the clamp member 33 can move relative to the torque taking member 35 on actuation of a hydraulic actuator in the clamp member 33 to apply friction pads (not shown) to opposite sides of a braking disc (not shown).

Each sliding pin connection 37 comprises an elongate pin 39, one end region of which is secured to the torque taking member 35, the pin 39 extending slidably through a bore 41 in the clamp member 33. To resist spurious axial movement of the pin 39 in the bore 41, a flexible and resilient rubber sleeve 43 incorporating a reinforcement 44 in the form of a sleeve, is provided on the pin 39, the sleeve 43 engaging the wall of the bore 41 to produce the desired frictional grip. As best seen in FIGS. 10 and 11 each pin 39 comprises two like halves 45, each half comprising a cylindrical member with a bore 47 extending axially therethrough. One end region of each half 45 has a reduced diameter section 48, the other end region having an annular groove 49 wherein a protective boot 51 (see FIG. 11) can engage to protect the sliding surfaces of the pin 39 and bore 41. On assembly the two halves 45 are coaxially aligned with each other with the reduced diameter sections 48 juxtaposed to each other and with the flexible sleeve 43 located over said reduced diameter section 48. The internal diameter of the flexible sleeve 43 is complementary to the diameter of the reduced diameter sections 48 and the external diameter of the sleeve 43 in an unstressed condition, is substantially the same as the diameter of the remainder of said halves 45. A bolt 52 extends through the aligned bores 47 and secures the pin 39 to the clamp member 33—see FIG. 11. The pins 39 are then located in the respective bore 41 in the torque taking member 35 and with the flexible sleeves 43 located within the bores 41, the bolts 49 are tightened. As the length 'Z' of the flexible sleeve 43 (see FIG. 10) is greater than the sum of the length 'A' and 'B' of the two reduced diameter sections 47, tightening of the bolts 49 causes the flexible sleeves 43 to be deformed radially outwardly into engagement with the walls of the bores 41. By preselecting the dimensions 'A', 'B' and 'Z', the desired amount of frictional grip can be attained whilst there is no problem in assembling the sliding connections 37.

Figure 12:
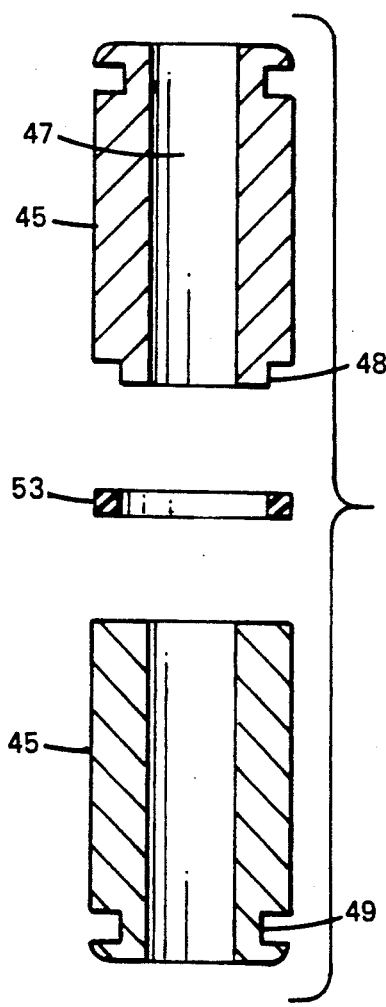
FIG. 12 is a cross-sectional exploded view of a modified pin suitable for use in the embodiment of FIG. 9.
Figure 13:
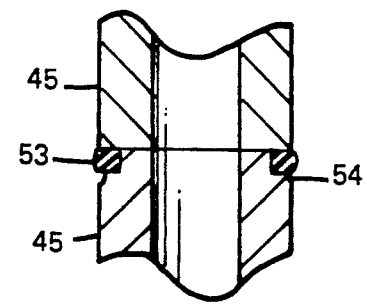
FIGS. 13 and 14 are cross sectional view of still further modified pins suitable for use in the embodiment of FIG. 9.
Figure 14:
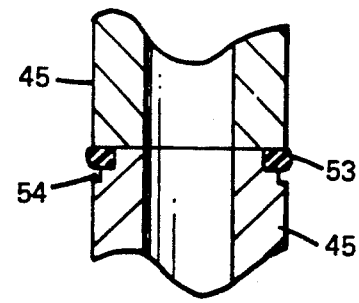

A modified sliding pin connection as illustrated in FIG. 12, the main difference from the embodiment of FIGS. 10 and 11, being that a reduced diameter section 47 is provided solely on one pin half 45. Further, the flexible sleeve takes the form of an annular ring 53 with the reduced diameter section 47 being appropriately dimensioned ie shoulder is brought than the axial dimension of the ring 53. The construction of FIG. 12 is further modified in both FIG. 13 and FIG. 14 with the shoulder 54 defined by the reduced diameter section 47 being profiled to produce a desired deformation of the ring 53 when the bolt 52 is tightened. The construction of FIG. 13 has an annular chamfered shoulder and the construction of FIG. 14 has an annular cutaway shoulder. This enables the annular ring 53 to deflect in a controlled manner upon actuation of the brake, such deflection resulting in a restoring force being generated upon brake release, such that a degree of positive retraction of the clamp member is experienced. As desired, the reinforced ring of FIG. 8 can equally well be used in the construction of FIG. 12, 13, and 14.

The present invention thus provides a pin sliding disc brake wherein the sliding pin connections can be easily assembled whilst providing the required amount of frictional grip to resist spurious pin movement.

I claim:

1. A disc brake comprising a clamp member and a torque taking member with the clamp member being slidably mounted on the torque taking member by means of at least one pin whereby the clamp member can slide relative to the torque taking member to apply a friction pad to each side of a braking disc, said at least one pin being engageable in a bore and having a two part construction including facing end sections, at least one of said end sections having a reduced diameter relative to the remainder of said pin, a flexible sleeve located between said parts on said at least one reduced diameter end section and means for securing said parts together so as to deform said flexible sleeve outwardly into engagement with the wall of said bore, said sleeve when located on said reduced diameter end section, and prior to deformation thereof being longer than the axial extent of said reduced diameter end section and also having an external diameter substantially the same as the diameter of said remainder of said pin, said securing means moving said parts together until said end sections thereof are contiguous subsequent to insertion of said pin into said bore.

2. A disc brake according to claim 1, wherein one of said parts of said at least one pin is in the form of a bolt, the other said part being formed by the remainder of said pin and said reduced diameter end section, said bolt being screw threadedly engaged in an axially extending, complementarily threaded bore in said reduced diameter end section of the said remainder of said pin, said flexible sleeve being held in position by said bolt.

3. A disc brake according to claim 2, wherein the bolt has a shaft with a threaded region which can be engaged in said threaded bore, and a reduced diameter cylindrical portion which is of the same diameter as the reduced diameter section of the remainder of said pin.

4. A disc brake according to claim 2, wherein the bolt has a head with a smooth cylindrical periphery of the same diameter as the major section of the remainder of the pin.

5. A disc brake according to claim 2, wherein the bolt has a head, the periphery of which is cutaway adjacent to the flexible sleeve.

6. A disc brake according to claim 2, wherein the flexible sleeve includes a reinforcement.

7. A disc brake according to claim 2, wherein said at least one pin projects into the bore from one end of the bore said bore being open from said one end through to its opposite end, and the axial end face of said bolt is adapted to receive a tool from said opposite end of the bore to enable the bolt to be tightened and the flexible sleeve to be thereby flexed radially outwardly following insertion of said pin, sleeve and bolt into said bore.

8. A disc brake according to claim 1, wherein said parts of said at least one pin are each in the form of a cylindrical member said cylindrical members having the same external diameter with an axially extending bore passing through each cylindrical member, a bolt passing through said bores to secure said cylindrical members to one of said clamp member and torque taking member in coaxial relationship with each other.

9. A disc brake according to claim 8, wherein the reduced diameter end section of a cylindrical member and the remainder of said cylindrical member, define a shoulder therebetween, with said shoulder being partially cutaway.

10. A disc brake according to claim 8, wherein the flexible sleeve includes a reinforcement.

11. A disc brake according to claim 8 wherein both of said facing end sections have a reduced diameter.

* * * * *